May 14, 1963 N. C. DAHL 3,089,303

AUTOMATIC TELEPHONE TIMER

Filed Oct. 31, 1961 2 Sheets-Sheet 1

INVENTOR.

Norman C. Dahl

BY

Dike, Thompson, Bronstein & Mrose

ATTORNEYS

May 14, 1963 N. C. DAHL 3,089,303

AUTOMATIC TELEPHONE TIMER

Filed Oct. 31, 1961 2 Sheets-Sheet 2

INVENTOR.

Norman C. Dahl

BY

Dike, Thompson, Bronstein & Mrose

ATTORNEYS 3,089,303

AUTOMATIC TELEPHONE TIMER

Norman C. Dahl, 40 Fern St., Lexington, Mass.

Filed Oct. 31, 1961, Ser. No. 148,904
11 Claims. (Cl. 58—145)

The present invention relates to improvements in automatic timing and, in one particular aspect, to novel and improved apparatus for the automatic clocking of telephone communications at subscriber stations, wherein miniaturized mechanisms of low manufacturing cost are operative to set and to power the timing through inertial effects.

The need for and advantages in having call timers associated with subscriber telephones have long been recognized and have formed the basis for a number of proposals for such equipment. In general, these are aimed at indicating elapsed time such that the subscriber may be apprised of over-time charges beyond those of a base period, such as the usual three-minute allowance for long-distance calls. To the extent that these devices are bulky or cumbersome, involve conscious or intricate winding or setting procedures, have any adverse effect upon the associated telephone equipment, or demand a high degree of skill in installation, maintenance or operation, they lack the attributes of optimum call-timing devices. In accordance with the present teachings, all of such difficulties are avoided in miniature devices which lend themselves to simple attachment centrally upon the dial plate of a subscriber's phone, in substitution for the usual cap through which the station number is displayed, and in which the relative dialing movements between the dial plate and inertia-restrained mechanism are effective to wind and set the timing devices without special attention from the caller.

It is one of the objects of the present invention, therefore, to provide novel and improved apparatus of highly miniaturized form and low-cost construction for automatically and reliably timing telephone communications at subscriber locations.

A further object is to provide a novel timing attachment for telephones which is wound and adjusted automatically and without interfering with the mechanisms of subscriber telephone installations.

Another object is to provide a telephone call timer adapted for ready and non-interfering attachment to a telephone dial plate and operated through inertial effects in response to dialing movements.

A yet further object is to provide improved telephone timers wherein rotary dialing motions cause inertial effects to wind and set clockwork mechanisms, and wherein time setting may alternatively be performed at a receiver station through a simple and convenient manipulation.

By way of a summary account of practice of this invention in one of its aspects, the central number-displaying cover or cap of a subscriber telephone dial plate is replaced by a timer attachment of comparable general proportions which contains a spring-wound clockwork escapement in driving relationship to a pointer by way of a slip-friction clutch, the pointer being rotatable in relation to a scale plate fixed with the dial plate of the telephone. An inertia wheel, having relatively large mass near its periphery, is also slip-friction clutched with the pointer and is effective to develop relative rotational movements which automatically urge the pointer to an initial zero-setting against a stop, in response to dialing movements in the clockwise direction, and an auxiliary inertia brake is effective to prevent unwanted relative movements which could tend to disturb the setting during counter-clockwise return motions of the dial plate. The clockwork mechanism is likewise wound during the dialing process, as a consequence of relative angular movement between that mechanism and the inertia wheel. Once the dialing sequence is completed, the escapement drives the pointer to clock the elapsed time for observation by the caller.

Although the features of this invention which are considered to be novel are set forth in the appended claims, further details as to preferred practices of the invention, as well as the further objects and advantages thereof, may be most readily comprehended through reference to the following description taken in connection with the accompanying drawings, wherein:

FIGURE 1 provides a pictorial view of the base of a common form of subscriber telephone, including a timer constructed in accordance with the present teachings;

Figure 1:
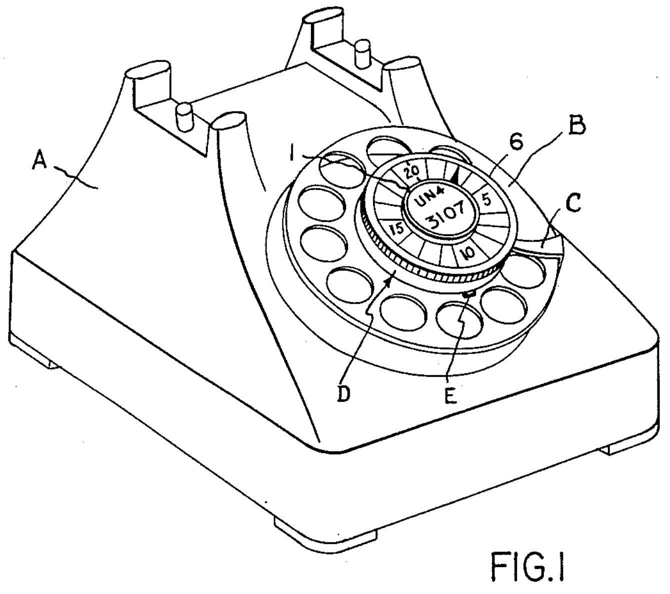
Figure 2:
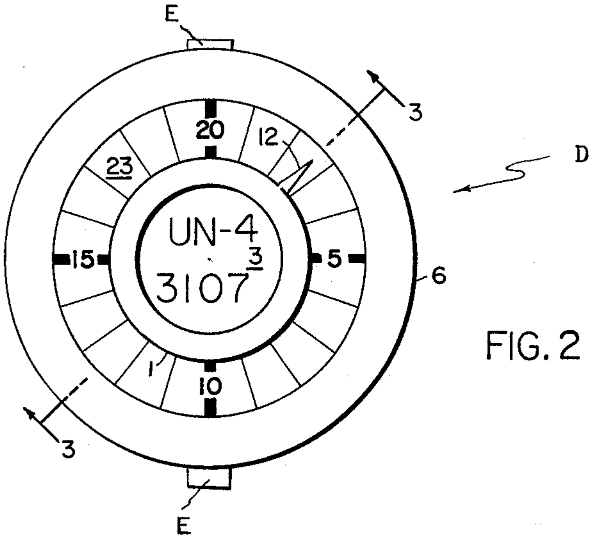
FIGURE 2 is a plan view of a timer unit.
Figure 3:
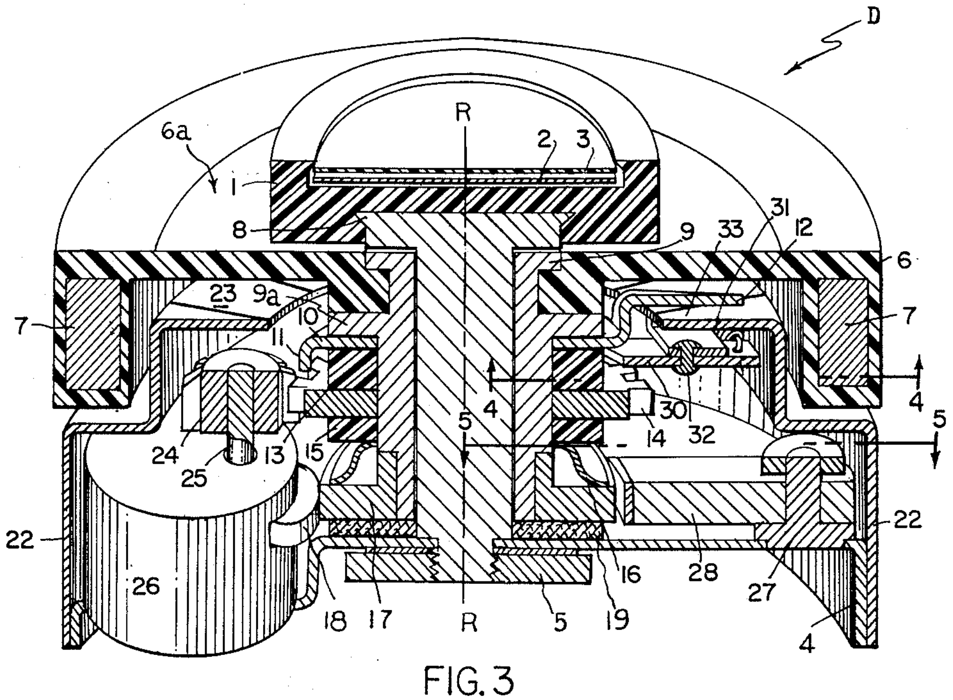
FIGURE 3 represents an enlarged cross-sectioned pictorial view of the timer unit of FIGURE 2 taken along section lines 3—3 of that figure.

The apparatus portrayed in FIGURE 1 comprises a conventional form of dial telephone base assembly A intended to receive and cradle the usual cord-connected handset (not illustrated), the apertured dial plate B and cooperating finger stop C being mounted in an inclined relationship for the subscriber's convenience in viewing and dialing. In a well known manner, the dial plate B is mounted for angular movements on an actuating shaft and is spring-biased such that it is always driven counter-clockwise to a predetermined stopped angular orientation following clockwise dialing of each digit identifying the called station. Centrally of the dial plate is disposed a generally cylindrical timer unit D which is of diameter smaller than the ring of dialing apertures and which is substituted for the customary central cap which is otherwise simply used to provide an ornamental covering of the bolted shaft connection to the dial plate and to display the station number. A pair of metal tabs snap into accommodating recesses in the dial plate for the purpose of retaining such caps, and, for convenient and unskilled installation and substitution of the timer unit of the present invention, corresponding tabs such as the tab E are employed also. The display of station number is likewise provided centrally of the timer unit D, however, on a slightly reduced scale, by means of a corresponding smaller cap 1 which is provided with the usual insert 2 bearing the exchange and station data and exhibiting these through a transparent plastic window 3 (FIGURES 2 and 3). Directly below the cap 1, although slightly spaced from it, is a larger generally circular plastic disk 6 which has an annular transparent window through which a movable clockwork-driven index in the form of a pointer and cooperating index in the form of a marked scale-plate are visible and display elapsed time to the user. The mechanisms next described cooperate to set and wind the timer unit without conscious effort or separate action by the caller.

As is depicted in FIGURE 3, the central plastic cap 1 of the generally cylindrical timer unit D is fixed to the top of a central stud 8 which is rigidly fastened to a mounting plate 4 by a locking nut 5, the mounting plate having the mounting tabs E integral with it such that the stud and mounting plate are fixed in relation to a telephone dial to which the entire unit may be attached. The generally circular plastic disk 6 immediately below cap 1 is molded with a heavy metal ring insert 7 near its periphery and is fastened centrally upon a hollow cylindrical sleeve 9 which is fitted about and rotatable in relation to the central stud 8. Inertia of disk 6, and the freedom for relative rotation between the sleeve 9 and stud 8, result in a tendency for the disk 6 to remain stationary as the telephone dial which carries the stud and frame 4 is accelerated swiftly about the axis of rotation R—R in the course of dialing. Consequently, at such times the circular shoulder 17 on sleeve 9 frictionally drives the engaged winding wheel 18 of a clockwork escapement device 26 affixed to the frame 4. Inner constructional details of clockwork device 26 are not illustrated, although it will be understood that this of course includes a mainspring wound by the wheel 18, preferably through a slip clutch, and an escapement which accurately regulates the rate at which the output pinion 24 is rotated by the output shaft 25. Thrust washer 19 introduces a material having a low coefficient of friction between the sleeve 9 and frame 4 to facilitate the intended relative movements when dialing occurs.

Clockwork device 26 rotates a pointer 12 in relation to a marked scaleplate 23 for the purpose of displaying elapsed time. Conveniently, the annular scaleplate is formed as part of a sheet metal enclosure 22 which houses the inner mechanisms of the timer unit, and suitable indicia, such as the twenty-minute graduations and numerals are imprinted upon the upper surfaces where they may be viewed together with the overlying pointer 12 through the transparent portion 6*a* of the inertia disk. Pointer 12 is integral with an annular metal disk 10 having a top surface which is frictionally engaged with the abutting metal surface of shoulder 9*a* of the concentric sleeve 9, and having a bottom surface which is frictionally engaged with an annular plastic ring 13 selected for its relatively low coefficient of sliding friction with the disk 10. Annular gear 14, which is meshed with and powered by the clockwork pinion 24, also frictionally engages the ring 13, for the purpose of driving the pointer through the slip-friction clutching formed by this assembly of parts associated with sleeve 9. Spring washer 16, acting through a low-friction washer 15, insures that this assembly is under a small constant compression which maintains a desired slip-friction coupling between pointer-disk 10 and sleeve 9 at a higher level than the slip-friction coupling or clutching between that pointer-disk and the clockwork-driven ring 13. Once the timing operation is under way, the pinion 24 simply drives main gear 14 and the latter carries the friction-coupled ring 13, disk 10 and pointer 12 around axis R—R with it, to register the elapsed time. At the same time, the sleeve 9 and disk 6 are very slowly rotated also, while the frame 4 and parts fixed upon it remain wholly stationary with the supporting telephone dial.

Figure 4:
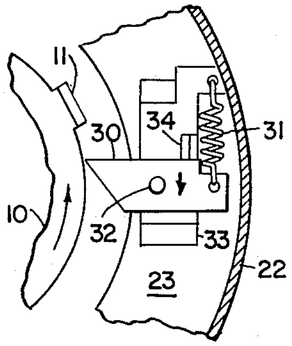
FIGURE 4 illustrates a fragment of a timer unit including a reset stop mechanism, in a view from below the unit.

Setting of the pointer counterclockwise to an initial zero or start position occurs automatically as the telephone dial is manually operated at the calling station. Each successive quick clockwise acceleration of the supporting telephone dial in the course of dialing causes the frame 4, enclosure 22, scaleplate 23, and stud 9 to move with it by the same amount, the actual angular excursions involved being dependent upon the letters and numbers dialed. However, during these brief successive periods, the inertia disk 6 and attached sleeve 9 tend to remain essentially stationary. Similarly, the pointer disk 10 which is in slip-friction connection with the sleeve shoulder 9*a* also is stationary, and the net result is that each clockwise dialing acceleration effects a relatively counterclockwise displacement of the pointer 12, in relation to the scaleplate 23. Lower-friction slippage between pointer disk 10 and ring 13, and between gear 14 and ring 13 and washer 15, permits the gear 14 to be moved clockwise relative to the pointer without carrying the pointer clockwise. Accurate zero-setting of the pointer is assured by a mechanical stop arrangement including as one stop element the integral depending tab 11 from pointer disk 10 and, as a second element, the movable pawl 30 pivoted on a shaft 32 mounted on a bracket 33 below the scaleplate 23. Spring 31 biases the pawl to a rest position against a further stop 34 in the form of a tab on bracket 33, as shown in the view from below in FIGURE 4. When the inertia ring 6 effects a relatively counterclockwise movement of pointer disk 10, the pointer stop tab 11 ultimately abuts stop pawl 30 and the pointer 12 is halted at the desired zero or start orientation. In the course of subsequent timing, when the pointer may move more than one revolution, the tab 11 encounters pawl 30 from the opposite side and then can readily deflect it against restraint of the biasing spring 31 to move further and thereby characterize more than the maximum twenty-minute or other interval marked on the scaleplate. Biasing spring 31 is selected to exert only a very weak restraint, such that pawl deflections do not overcome the frictional connection between pointer disk 10 and the clutching ring 13 which transmits torques from gear 14.

Figure 5:
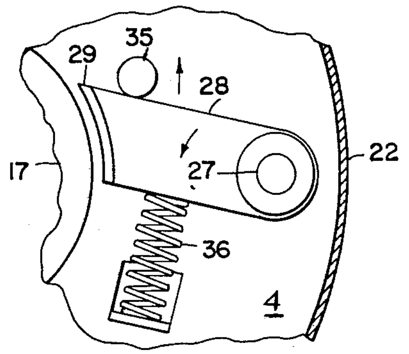
FIGURE 5 illustrates a fragment of a timer unit including an inertial brake mechanism, in a view from below the unit.

In FIGURES 3 and 5 there is also illustrated an inertial braking mechanism which prevents unwanted clockwise motion of the inertia disk 6 and, hence, the pointer 12, in the clockwise direction whenever the supporting telephone dial plate accelerates counterclockwise following the dialing of each digit. This mechanism includes a brake lever 28 pivoted upon the frame 4 by a pin 27 and normally urged against a stop 35 by a biasing spring 36 such that its end brake surface 29 is out of engagement with the periphery of shoulder 17 on the sleeve 9. However, counterclockwise acceleration of the frame 4, which occurs as the telephone plate is released by the user after one digit has been dialed, causes the inertia of inertially-unbalanced brake lever 28 to deflect inwardly until the braking surface 29 engages and binds with the shoulder 17. This locking action prohibits clockwise deflection of the pointer unitl the counterclockwise acceleration has stopped.

In the usual dialing sequence involving seven digits there is ample counterclockwise motion of the index or pointer 12 to cause its return to the zero setting in relation to the cooperating index 23. Excess motions merely result in slippage in the clutching elements once the pointer has been stopped. Overwinding of the clockwork escapement is likewise inhibited by clutch slippage. During the timing intervals, the inertia disk 6 is moved so slowly as to offer only negligible resistance to the driving power of the clockwork, even though at other times it develops substantial torques needed for both winding and setting. The peripheral surfaces of inertia disk 6 are preferably knurled, as an aid to manipulation of this disk by the subscriber. In the latter connection, it may be desirable for the receiver of a call to set his timer unit, and this may readily be done merely by twisting the disk 6 in a counterclockwise direction; the caller may likewise find it advantageous, at times, to reset the timer in this manner, as for the purpose of coordinating the start of timing with completion of the desired connection.

While specific practices have been described, and while one preferred embodiment has been illustrated and referred to in the descriptions, it should be understood that various changes, modifications, additions and substitutions may be effected without departure from these teachings, and it is aimed in the appended claims to embrace all such variations as fall within the true spirit and scope of this invention.

What I claim as new and desire to secure by Letters Patent of the United States is:

1. A timer for dial telephones comprising framework substantially centrally of the dial plate of a telephone, an index mounted on said framework for angular movement about the axis of rotation of said dial plate, inertia means connected with said index and angularly movable therewith about said axis to introduce relatively high inertia which resists sudden accelerations of said index about said axis when said framework is suddenly accelerated about said axis, stop means obstructing angular movement of said index relative to said framework in one direction beyond a predetermined relative angular orientation of said index and framework, a clockwork mechanism mounted on said framework, clutching means connecting said clockwork mechanism with said index to drive said index at a relatively slow and regulated rate about said axis in direction opposite to said one direction, and index means positioned on said framework in cooperative relationship with said movable index.

2. A timer for dial telephones in which the digits of a dialed number are dialed by sudden angular movements of a dial plate, comprising framework substantially centrally of the dial plate of a telephone, a movable index mounted on said framework for angular movement about the axis of rotation of said dial plate, index means fixed with said framework in cooperative relationship with said movable index, inertia means including heavy mass radially spaced from said axis connected with said index for movement therewith about said axis and imparting relatively high inertia thereto resisting sudden accelerations about said axis, whereby said index tends to remain stationary while said framework is angularly accelerated about said axis as each digit of a number is dialed by sudden angular movement of the telephone dial plate, stop means obstructing angular movement of said index relative to said framework in one angular direction beyond a predetermined relative angular orientation of said index and framework, a spring-wound clockwork mechanism mounted on said framework and having a rotatable winding member, means connecting said winding member with said inertia means for rotation responsive to relative angular movement between said inertia means and said framework, and clutching means connecting said clockwork mechanism with said index to drive said index at a relatively slow and regulated rate about said axis in direction opposite to said one direction.

3. A timer for dial telephones as set forth in claim 2 wherein said clutching means includes a slip-friction connection permitting angular movement of said index and inertia means about said axis in said one direction relative to said framework and clockwork mechanism.

4. A timer for dial telephones as set forth in claim 2 wherein said dial plate includes annularly-arrayed finger apertures, wherein said timer is in the form of an attachment to said dial plate which is of lesser diameter than the inner diameter of the annularly-arrayed finger apertures of the telephone dial plate, and wherein said inertia means is of circular outline and has an outer peripheral portion exposed for manual rotation in said one direction to set said index.

5. A timer for dial telephones as set forth in claim 2 further comprising brake means angularly locking said index in relation to said framework responsive to angular acceleration of said framework in said one angular direction.

6. A timer attachment for dial telephones comprising a framework including means for affixing said framework to the dial plate of a telephone substantially centrally thereof, an inertia member pivotally mounted on said framework for angular movement about the axis of rotation of said telephone dial plate, an inertia brake locking said inertia member in relation to said framework responsive to counter-clockwise accelerations of said dial plate and framework about said axis, an index member, first means clutching said index member with said inertia member for movement in relation to said framework about said axis, stop means obstructing counter-clockwise movement of said index member relative to said framework beyond a predetermined relative angular orientation of said index member and framework about said axis, a clockwork mechanism mounted on said framework, second means clutching said clockwork mechanism with said index member to drive said index member at a relatively slow and regulated rate about said axis in a clockwise direction, said first clutching means having a slipping torque about said index which is greater than the slipping torque of said second clutching means.

7. A timer attachment for dial telephones as set forth in claim 6 wherein said clockwork mechanism is spring-wound, and further comprising a rotatable winding member in said clockwork mechanism, and means connecting said winding member with said inertia member for rotation responsive to relative angular movement between said inertia member and said framework.

8. A timer attachment for dial telephones comprising a framework including means for affixing said framework to the dial plate of a telephone substantially centrally thereof, an inertia disk pivotally mounted on said framework for angular movement about the axis of rotation of said telephone dial plate, an inertia brake locking said inertia disk in relation to said framework responsive to angular accelerations of said dial plate and framework in one direction about said axis, an index member mounted on said framework for angular movement about said axis, a first slip-clutch connection between said index member and said disk angularly coupling said index member with said disk about said axis, stop means positioned on said framework to stop angular movement of said index member relative to said framework in said one direction when said index member and framework are in a predetermined relative angular orientation about said axis, index means fixed with said framework in cooperative indexing relationship with said index member, a clockwork mechanism mounted on said framework, and means including a second slip-clutch connection with said index member connecting said clockwork mechanism in driving relationship to said index member, said first slip-clutch connection having a greater frictional coupling torque with said index member about said axis than said second slip-clutch connection.

9. A timer attachment for dial telephones wherein the dial plates thereof include an annular array of finger apertures, as set forth in claim 8, wherein said index member includes a pointer underlying said inertia disk, wherein said index means comprises a marked scaleplate fixed with said framework below said pointer, wherein said inertia disk has a transparent plastic window section overlying said pointer and scaleplate to expose the readings thereof, and wherein said inertia disk is generally cylindrical and has an exposed periphery of diameter smaller than the inner diameter of the annular array of finger apertures in the telephone dial plate, whereby said exposed periphery may be manipulated angularly about said axis to set said pointer in relation to said scaleplate.

10. A timer attachment for dial telephones as set forth in claim 8 wherein said inertia brake comprises a lever pivoted on said framework eccentrically in relation to said axis and in position to be pivoted into locking frictional connection with said inertia disk by inertia upon angular acceleration of said framework in said one direction, and resilient means biasing said lever in direction to separate said frictional connection.

11. A timer attachment for dial telephones as set forth in claim 8 wherein said stop means comprises a spring-biased pawl pivoted on said framework in position to interfere with a portion of said index member when said index member moves in said direction to said predetermined angular orientation, and wherein said spring-biased pawl pivots to permit said portion of said index member to move past in said opposite direction.

References Cited in the file of this patent

UNITED STATES PATENTS

| | | |
|---|---|---|
| 2,876,617 | Canning et al. | Mar. 10, 1959 |
| 3,018,613 | Jaccard | Jan. 30, 1962 |